(12) United States Patent
Scott et al.

(10) Patent No.: US 8,516,916 B2
(45) Date of Patent: Aug. 27, 2013

(54) LINEAR ACTUATOR

(75) Inventors: Jon Scott, Vancouver (CA); Ray Tat Lung Wong, Richmond (CA); Anson Chan, Richmond (CA)

(73) Assignee: Marine Canada Acquisition Inc., Richmond (CA)

( * ) Notice: Subject to any disclaimer, the term of this patent is extended or adjusted under 35 U.S.C. 154(b) by 424 days.

(21) Appl. No.: 12/815,706

(22) Filed: Jun. 15, 2010

(65) Prior Publication Data

US 2010/0314956 A1 Dec. 16, 2010

Related U.S. Application Data

(60) Provisional application No. 61/187,575, filed on Jun. 16, 2009.

(51) Int. Cl.
*B60K 20/00* (2006.01)

(52) U.S. Cl.
USPC .................................. 74/473.36; 74/473.37

(58) Field of Classification Search
USPC .................... 74/473.36, 473.37; 15/250.23
See application file for complete search history.

(56) References Cited

U.S. PATENT DOCUMENTS

| | | | | |
|---|---|---|---|---|
| 4,349,091 A | | 9/1982 | Miyake et al. | |
| 5,408,719 A | * | 4/1995 | DeRees et al. | 15/250.23 |
| 6,018,223 A | * | 1/2000 | Oruganty et al. | 318/10 |
| 6,082,514 A | * | 7/2000 | Averill | 192/69.42 |
| 6,173,624 B1 | * | 1/2001 | Decker | 74/473.37 |
| 7,810,627 B2 | * | 10/2010 | Saitoh | 192/219.5 |

* cited by examiner

*Primary Examiner* — David M Fenstermacher
(74) *Attorney, Agent, or Firm* — Cameron IP

(57) ABSTRACT

There is provided a linear actuator. The linear actuator has a mounting member. The linear actuator has an output member constrained to move linearly with respect to the mounting member along a linear axis. The linear actuator includes a motor assembly pivotally mounted on the mounting member. The motor assembly has a pivotal actuator member which is pivotally connected to the output member. The motor assembly is capable of moving the output member along the linear axis.

17 Claims, 11 Drawing Sheets

LINEAR ACTUATOR

CROSS REFERENCE TO RELATED APPLICATION

This application claims the benefit of provisional application 61/187,575 filed in the United States Patent and Trademark Office on Jun. 16, 2009, the disclosure of which is incorporated herein by reference and priority to which is claimed.

FIELD OF THE INVENTION

The present invention relates to a linear actuator. In particular, it relates to a linear actuator with a variable transmission ratio.

DESCRIPTION OF THE RELATED ART

Linear actuators are used in a wide variety of applications. However there is a need for an improved linear actuator for some applications.

BRIEF SUMMARY OF INVENTION

The present invention provides a linear actuator disclosed herein. It is an object of the present invention to provide an improved linear actuator.

The linear actuator disclosed herein involves a novel mechanism that inhibits side loads, inhibits non-linear rod or cable assembly movement, and provides a variable transmission ratio.

There is accordingly provided a linear actuator including a mounting member. The linear actuator has an output member constrained to move linearly with respect to the mounting member along a linear axis. The linear actuator includes a motor assembly pivotally mounted on the mounting member. The motor assembly has a pivotal actuator member which is pivotally connected to the output member. The pivotal actuator member is capable of moving the output member along the linear axis.

There is also provided a linear actuator having a mounting member and a motor assembly pivotally mounted on the mounting member along a first pivot axis. The motor assembly has a pivotal actuator member which is pivotally connected to the mounting member along a second pivot axis at one end of the pivotal actuator member. The pivotal actuator member is constrained to move linearly with respect to the mounting member along a linear axis at said one end. The motor assembly is capable of moving the said one end of the pivotal actuator member along the linear axis.

There is further provided a linear actuator having a mounting member. The mounting member has an elongate portion. The linear actuator includes a motor having a motor housing. The linear actuator includes an output shaft operatively connected to and driven by the motor. The linear actuator includes a motor mount having a first end and a second end spaced-apart from the first end. The first end of the motor mount is operatively connected to the motor housing. The motor mount pivotally connects to the mounting member near the second end of the motor mount. The linear actuator includes an arm having an input end operatively connected to the output shaft and an output end positioned radially outwards from the output shaft. The output end of the arm is slidable along the elongate portion of the mounting member. The arm is connectable to a rod for moving the rod in a path parallel with the elongate portion thereby.

There is yet further provided, in combination, the linear actuator described in the above paragraph and the rod for connection therewith.

There is also provided a linear actuator having a mounting member. The linear actuator has an output member constrained to move linearly with respect to the mounting member along a linear axis. The linear actuator includes a motor pivotally mounted to the mounting member. The linear actuator includes an output shaft operatively connected to and driven by the motor. A pivotal actuator member is connected to and radially extends from the output shaft. The pivotal actuator member is pivotally connected to the output member and the motor is capable of moving the output member along the linear axis thereby.

BRIEF DESCRIPTION OF DRAWINGS

The invention will be more readily understood from the following description of preferred embodiments thereof given, by way of example only, with reference to the accompanying drawings, in which.

DESCRIPTION OF THE PREFERRED EMBODIMENTS

Figure 1:
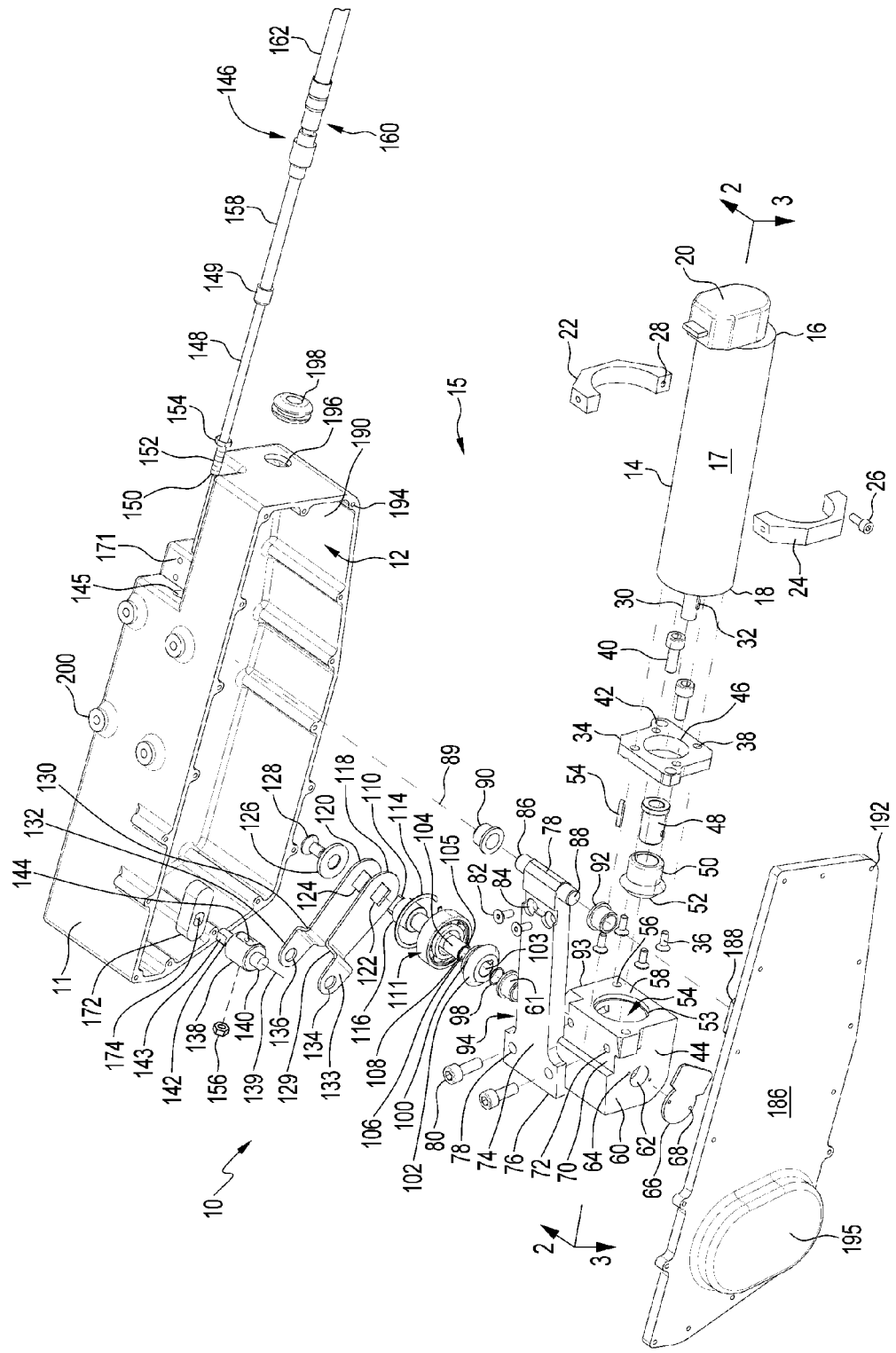
FIG. 1 is an exploded, isometric view of an improved linear actuator and rod embodiment of the present invention.

Referring to FIG. 1, a linear actuator is shown generally by numeral 10. The linear actuator 10 is shown in an exploded view. The linear actuator 10 includes a mounting member in this example a hollow housing 11 having an interior 12. The housing 11 serves to mount the components described below and protect said components disposed within the interior 12.

The linear actuator 10 includes a motor assembly shown generally by reference numeral 15. The motor assembly 15 has a motor, in this example an electric motor 14 disposable within the interior 12 of the housing.

In general terms, the motor 14 is pivotally connected to the housing 11 via a motor mount 74. The motor 14 operatively engages a bevel driving gear 50 which in turn engages a bevel driven gear 100. The bevel driven gear 100 is mounted on and connected to an output shaft 104. The motor 14 thereby rotates the output shaft 104 which in turn causes a pivotal actuator member, in this example having two arms 118 and 120, to rotate. The arms 118 and 120 pivotally connect to a pivot pin member 138. There is provided a rod apparatus 146 having a rod 148. The pivot pin member 138 has a rod aperture 144 which threadably receives the rod 148.

Figure 6:
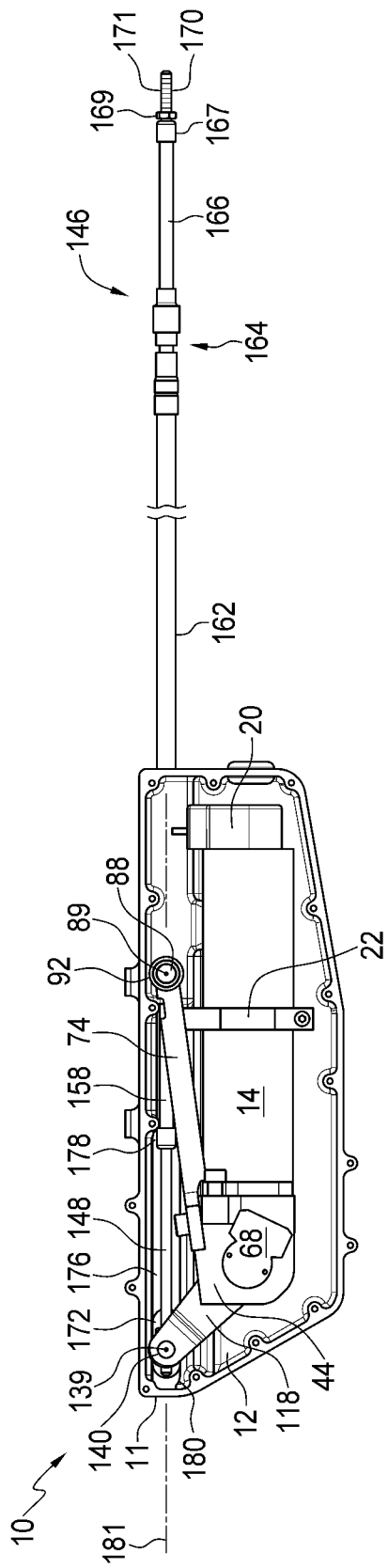
FIG. 6 is a second side elevation view of the linear actuator and rod of FIG. 1, in assembled form, opposite the first side elevation view of FIG. 5, and with the mounting member partially removed.

The pivot pin member 138 is also connected to an output member, in this example a slider 172. The motor assembly 15 includes the motor 14, arms 118 and 120, and all the parts connected therebetween. As best shown in FIG. 6, the slider 172 slidably engages with, in this example, a grooved slot 176 provided in the housing 11. In this manner, as the motor 14 rotates in opposite directions, and referring now to FIGS. 8 to 10, the arms as shown by arm 120 pivot, and thus cause pivot pin member 138 and slider 172 to move back and forth in slot 176. This in turn causes the rod 148 to move back and forth, to the left and to the right from the perspective of FIGS. 8 to 10.

The linear actuator 10 and rod 148 and their operation will now be described in greater detail.

Referring back to FIG. 1, the motor 14 has a motor housing 17 and a first end 16 upon which a first position sensor 20 is mounted in this example. The first position sensor 20 in this example is an encoder. The motor 14 has a second end 18 opposite the first end 16. The motor housing 17 extends from the first end 16 to the second end 18. There is provided a clamp having a first clamp half 22 and a second clamp half 24 shaped to wrap around the motor 14 via the motor housing 17. The clamp halves 22 and 24 connect together in this example by means of a bolt 26 that passes through clamp half 24 and is received by threaded aperture 28 of clamp half 22. The motor 14 has a motor shaft 30 that extends outwards from the second end 18. In FIG. 1 a key 32 is shown engaged within a slot (not shown) of the motor shaft 30.

The motor assembly 15 may include gears and in this example includes the bevel driving gear 50. The bevel driving gear 50 is operatively connected to the motor shaft 30. In this example a bushing 48 is provided. The bushing is fixedly engaged with and is keyed to the motor shaft 30 via the key 32, though the bushing 48 is not required. The bevel driving gear 50 is fixedly engaged with and keyed to the bushing 48 via key 54. The bevel driving gear 50 has gear teeth 52.

The motor assembly 15 may include a gear box and in this example includes a bevel gear box 44. The bevel gear box 44 has an interior 54 with a first central aperture 53 in communication therewith. The bevel driving gear 50 extends through the first central aperture 53 and is disposed within the interior 54.

A spacer 34 is interposed between the bevel gear box 44 and the motor 14. The spacer 34 has a central aperture 46 through which the bushing 48 and the bevel driving gear 50 extend rotatably through.

The spacer 34 is connected to the motor 14 via four bolts 36 in this example. The bolts 36 pass through four similar sized, spaced-apart apertures 38. The bolts 36 connect to the motor 14 via corresponding threaded apertures (not shown) on the motor 14.

The spacer 34 is connected to front 58 of the bevel gear box 44 via two bolts 40. The bolts 40 pass through a pair of apertures in the spacer 34 as shown by aperture 42. The bolts connect to the bevel gear box 44 via threaded apertures on the bevel gear box 44 as shown by aperture 56.

In this example the motor assembly 15 includes the motor mount 74, which is operatively connected to the motor 14. The motor mount 74 has a first end 76 and a second end 78 opposite the first end 76. The motor mount 74 in this example is connected with the motor 14 via top 70 of the bevel gear box 44. The top 70 in this example is perpendicular to the front 58 of the bevel gear box 44. Two bolts as shown by bolt 80 pass through a pair of apertures of the motor mount 74 as shown by aperture 79. The bolts 80 engage with a pair of threaded apertures of the bevel gear box 44 that extend inwards from the top 70 and one of which is illustrated by aperture 72.

Figure 2:
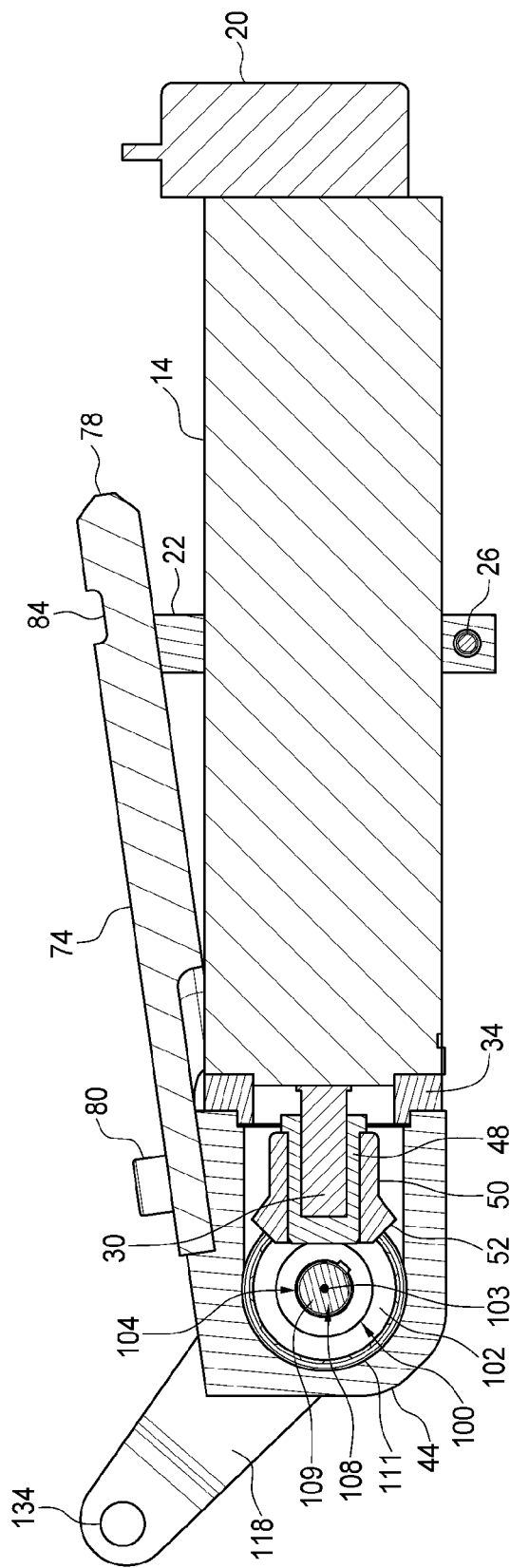
FIG. 2 is a sectional view taken along section 2-2 of the linear actuator of FIG. 1, with the linear actuator being in assembled form and with the mounting member of the linear actuator being not shown.

Two bolts 82 pass through apertures of the motor mount 74 as shown by aperture 84. Referring to FIG. 2, the motor mount 74 abuts with and engages the clamp surrounding the motor 14 as shown by clamp half 22. Bolts 82 (shown in FIG. 1) fasten the motor mount 74 to the clamp halves 22 and 24. This acts to increase the bending rigidity between the motor mount 74 and the motor 14. By using the clamp halves, the rigid body defined by the components labelled by numerals 74, 14, 22 and 24 is more rigid, which is important when the linear actuator 10 is providing an output force.

Referring back to FIG. 1, the motor mount 74 has two spaced-apart protrusions, in this example, cylindrical protrusions 86 and 88 at the second end 78 of the motor mount 74. The central axis of the protrusions 86 and 88 coincides with a first pivot axis 89. Bushings 90 and 92 fit over the cylindrical protrusions 86 and 88 respectively.

Figure 5:
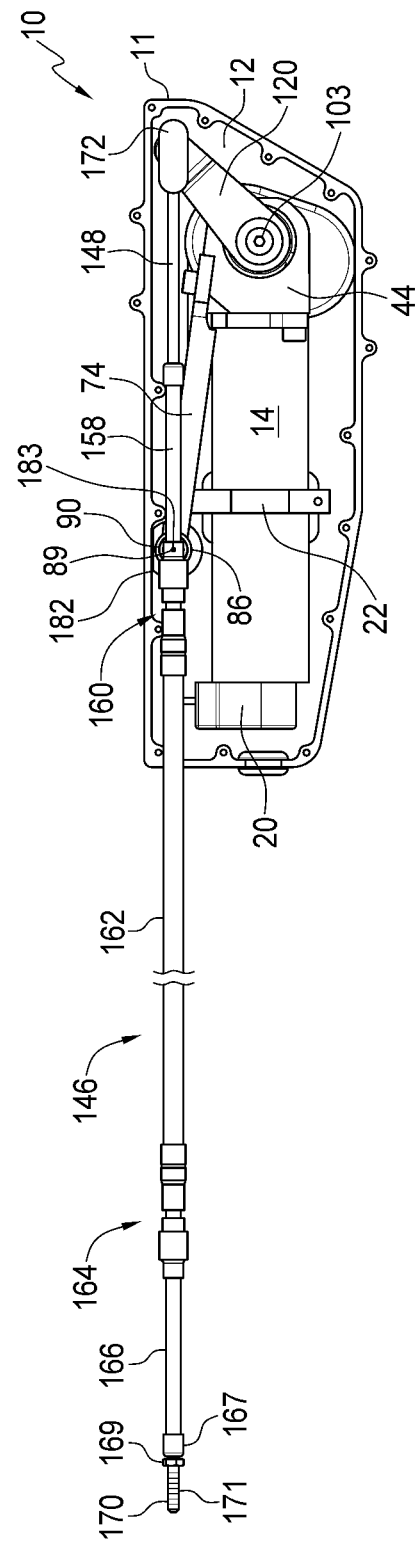
FIG. 5 is a first side elevation view of the linear actuator and rod of FIG. 1 in assembled form with a mounting member cover thereof being removed.

The protrusions 86 and 88 connect to the housing 11. Bushing 92 rotatably connects to the housing 11 at a fixed location, in this example, at a recess 188 on housing cover 186. The housing 11 receives the bushing 92 via the recess 188. Referring to FIG. 5, bushing 90 rotatably connects to the housing 11 at a fixed location, in this example, at recess 182. The housing 11 receives the bushing 90 via the recess 182. The recess 182 has a center point 183. The center point of the recess 182 corresponds to that of the recess 188. The center points of the recesses 182 and 188, such as center point 183, axially align and coincide with the first pivot axis 89. Put another way the recesses 182 and 188 directly correspond to the first pivot axis 89.

The motor mount 74 is pivotally connected to the housing 11 via bushings 90 and 92 for pivoting about the first pivot axis 89.

Figure 3:
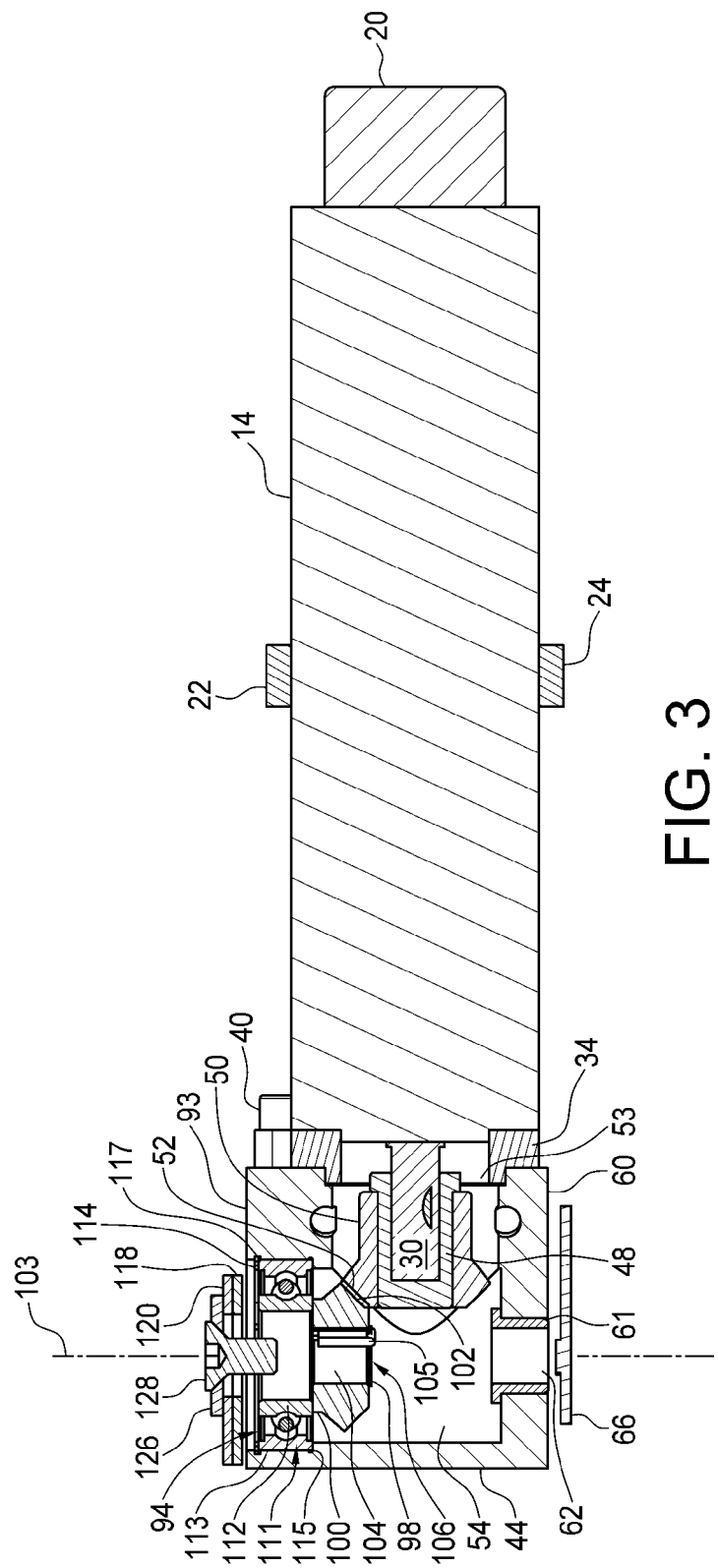
FIG. 3 is a sectional view taken along section 3-3 of the linear actuator of FIG. 1, with the linear actuator being in assembled form and with the mounting member of the linear actuator being not shown.
Figure 4:
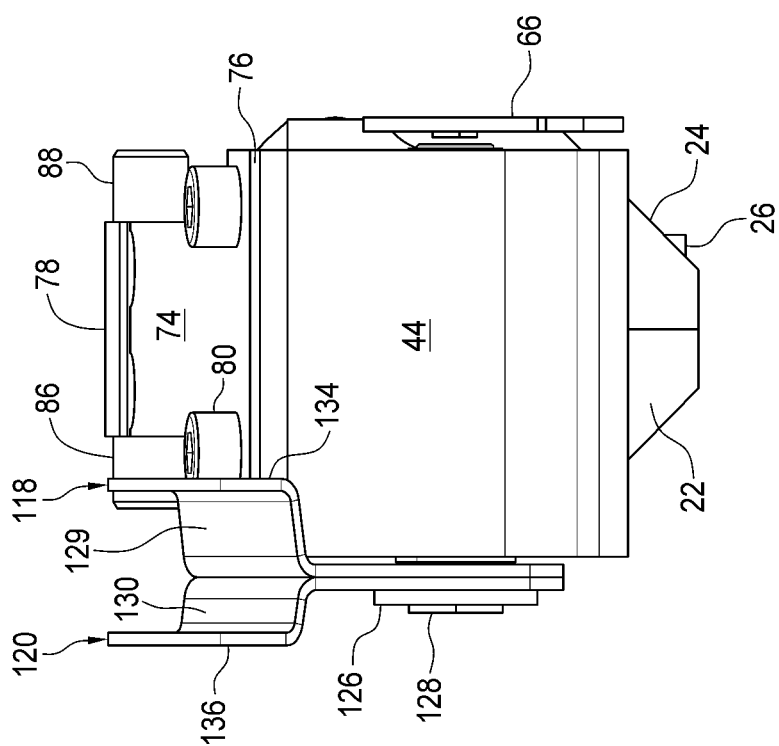
FIG. 4 is a rear elevation view of the linear actuator of FIG. 1 with the linear actuator being in assembled form.

Referring back to the FIG. 1 and describing the bevel gear box 44 in more detail, the bevel gear box 44 has a first side 60. The first side 60 in this example is perpendicular to top 70 and is also perpendicular to front 58. The first side 60 includes an aperture 62 in communication with the interior 54 of the bevel gear box 44. As best shown in FIG. 3, a bushing 61 fits within the aperture 62.

As shown in FIG. 1 second position sensor 66 is connected to the side 60 and in this example is aligned with the aperture 62. Two bolts (not shown) pass through two apertures of the second position sensor 66 as shown by aperture 68. The bolts threadably engage two apertures of the bevel gear box 44 as shown by aperture 64 for securing the second position sensor 66 to the bevel gear box 44.

As best shown in FIG. 3, the bevel gear box 44 has a second side 93 opposite the first side 60. The bevel gear box 44 has a second central aperture 94 extending inwards from the second side 93. The second central aperture 94 is in communication with the interior 54.

The bevel driven gear 100 is disposed within the bevel gear box 44. The bevel driven gear 100 has gear teeth 102 that mesh with the gear teeth 52 of the bevel driving gear 50. The bevel driven gear 100 is fixedly engaged with and keyed to the output shaft 104 via key 105.

The output shaft 104 has an axis of rotation 103. The output shaft 104 has a first end 106. A snap ring 98 extends around the output shaft 104 adjacent the first end 106. The snap ring 98 abuts with the bevel driven gear 100. Referring to FIG. 1 the output shaft 104 includes a cylindrical recess 108 which extends inwards from the first end 106. Referring to FIG. 2 a magnet 109 is disposed within the recess 108.

Referring back to FIG. 3, a bearing 111 is disposed within the second central aperture 94 of the bevel gear box 44. The bearing 111 has an inner race 112 that abuts the bevel driven gear 100. The bearing 111 has an outer race 113 that is seated against an inner shoulder 115 of the bevel gear box 44 that extends inwards from the second central aperture 94. The bearing 111 is held in place at least in part by a snap ring 114. The snap ring 114 is disposed within a groove 117 located within the second central aperture 94 of the bevel gear box 44.

The output shaft 104 extends through the bearing 111 and through the snap ring 114 to a second end 110, as shown in FIG. 1. The second end 110 of the output shaft 104 in this example is square shaped, though this is not required. The output shaft 104 has a section in this example a cylindrical section 116 adjacent to the second end 110.

The motor assembly 15 includes the pivotal actuator member which in this example is in the form of the two arms 118 and 120. The arms 118 and 120 have input ends in this example coinciding with square-shaped apertures 122 and 124. The apertures 122 and 124 are shaped to receive the second end 110 of the output shaft 104. The arms 118 and 120 are thereby operatively connected to the output shaft 104. The arms 118 and 120 are held in place by a bolt 128, which receives a washer 126 which in turn abuts with arm 120. The bolt 128 passes through the apertures 122 and 124 of the arms 118 and 120 and threadably engages with a threaded aperture (not shown) of the output shaft 104 extending inwards from the second end 110.

Arm 118 is elongate, with an outwardly extending portion 129, a flange portion 133 connected thereto. Arm 118 has an output end positioned radially outwards from the output shaft 104 and in this example the output end coincides with an aperture 134. Aperture 134 extends through the flange portion 133. Likewise arm 120 is elongate, with an outwardly extending portion 130 and a flange portion 132 connected thereto. Arm 120 has an output end positioned radially outwards from the output shaft 104 and in this example the output end coincides with an aperture 136. Aperture 136 extends through the flange portion 132. The portion 130 of arm 120 extends in a direction opposite to that of portion 129 of arm 118.

The motor assembly 15 includes the pivot pin member 138. The arms 118 and 120 in this example are shaped to receive the pivot pin member 138. The pivot pin member 138 has a first protrusion, in this example a cylindrical protrusion 140 upon which arm 118 pivotally connects via its aperture 134. The pivot pin member 138 has a second protrusion in this example a cylindrical protrusion 142 and upon which arm 120 pivotally connects via its aperture 136. The cylindrical protrusions 140 and 142 are on opposite ends of the pivot pin member 138 and are aligned along a second pivot axis 139.

The pivot pin member 138 includes the rod aperture 144, between the protrusions 140 and 142, for receiving the rod apparatus 146.

The rod apparatus 146 includes the rod 148. The rod 148 has a first rod end 150 with threads 152. A nut 154 is threadably engaged to the rod 148 adjacent to the first rod end 150. The rod 148 is connected to the pivot pin member 138 by first passing the rod apparatus 146 through an aperture 145 in the housing 11 until the first rod end 150 is adjacent to the pivot pin member 138. The first rod end 150 then passes all the way through the rod aperture 144 of the pivot pin member 138 until the first rod end 150 extends past the pivot pin member 138. A nut 156 is then threaded onto the first rod end 150. The nut 154 may then be tightened such that the nuts 154 and 156 both snugly engage against the pivot pin member 138 for securely connecting the rod 148 to the pivot pin member 138 thereby.

The rod apparatus 146 includes a first annular fitting 149 through which the rod 148 passes and a first sleeve 158 within which the rod 148 also passes. A first cable mount 160 is adjacent to the first sleeve 158. The first cable mount 160 is clamped to the housing 11 via a u-clamp (not shown). The u-clamp is bolted to the housing 11 by way of bolts threadably engaging two apertures of the housing 11 as shown by aperture 171. The u-clamp is thereby pressed down against the first cable mount 160. In this manner the rod apparatus 146 is connected to the housing 11. A cable jacket 162 extends past the first cable mount 160 and away from the linear actuator 10.

Referring now to FIG. 6, the cable jacket 162 connects to a second cable mount 164, which in turn connects to a second sleeve 166. The second sleeve 166 in turn connects to a second annular fitting 167. The rod 148 extends through and past the second annular fitting 167 to a second rod end 170. The second rod end 170 has threads 171. A nut 169 is threadably connected to the rod 148 adjacent to the second end 170.

Referring back to the pivot pin member 138 as shown in FIG. 1, the pivot pin member 138 has an end 143 (in this example square-shaped) that is adjacent to the second cylindrical protrusion 142 and which outwardly extends therefrom.

In this example, the output member of the linear actuator is in the form of the slider 172. The slider 172 has an elongate shape. It includes an aperture, in this example a square-shaped aperture 174, to mate with the end 143 of the pivot pin member 138. The slider 172 and the pivot pin member 138 are operatively connected thereby.

Referring to FIG. 6, the slider 172 is disposed within an elongate portion of the housing 11, in this example, the grooved slot 176 of the housing 11. The grooved slot 176 has a first end 178 and a second end 180 opposite the first end 178. The grooved slot 176 coincides has a longitudinal, linear axis 181. The slider 172 is linearly displaceable along the grooved slot 176 between ends 178 and 180. In one preferred embodiment, the linear axis 181 intersects perpendicularly with the first pivot axis 89, though this is not required.

Referring back to FIG. 1 and referring now to the housing 11 in further detail, the housing 11 includes in this example four mounting holes as shown by mounting hole 200. The mounting holes may be used for fixedly securing the linear actuator 10 to a wall, component or other apparatus.

The housing 11 also includes an end aperture 196 which receives a nipple 198. This may be used for passing electrical cables therethrough in order to, for example, power the motor 14.

The housing 11 has a side opening 190 in communication with the interior 12. A plurality of threaded apertures of the housing 11 as shown by aperture 194 are adjacent to the opening 190.

The housing cover 186 is for covering the opening 190. The housing cover 186 has apertures as shown by aperture 192 which match the recesses of the housing 11 as shown by aperture 194. The housing cover 186 may be secured to the housing 11 by way of bolts (not shown) passing through for example the aperture 192 and then threadably engaging with apertures of the housing 11 such as for example aperture 194.

The housing cover 186 includes an outwardly expanded portion 195. The outwardly expanded portion 195 is shaped to provide greater room for the various parts of the bevel gear box 44 and other adjacent parts of the motor assembly 15 disposed within the interior 12 of the housing 11.

Figure 7:
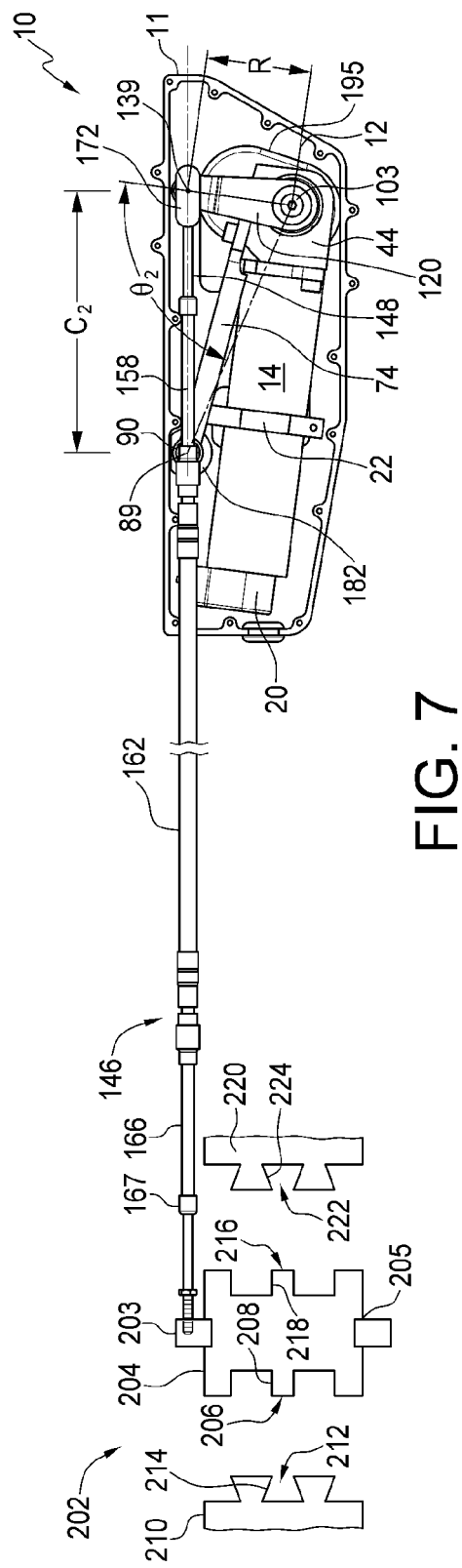
FIG. 7 is a side elevation view similar to FIG. 5 of the linear actuator and rod in combination with a clutch assembly as shown by a close up of a dog clutch and claws for engaging a forward drive gear wheel and a rear drive gear wheel.

Referring now to FIG. 7, a clutch assembly, in this example a dog clutch assembly 202, is operatively connected to the rod 148 and thereby to the linear actuator 10. Clutch assemblies such as the dog clutch assembly 202 are well known to those skilled in the art. A dog clutch assembly for a marine application is for example described in U.S. Pat. No. 4,349,091 to Miyake et al., the full disclosure of which is incorporated herein by reference. The dog clutch assembly 202 in this example is configured for a marine shifting application, though the subject matter of the present invention is also applicable to non-marine applications.

The dog clutch assembly 202 includes a dog 204. The dog 204 is splined to an output shaft (not shown) operatively connected for example to a propeller (not shown). The dog 204 in this example has a bearing 203, shown in simplified form. The inner race of the bearing 203 is mounted within annular groove 205. The rod 148 in this example is threadably connected to the outer race of the bearing 203 and is thereby operatively connected to the dog 204. The dog 204 has a plurality of claws such as claw 206 having inner walls such as inner wall 208. Claw 216 has inner walls such as inner wall 218. In one embodiment inner walls 208 and 218 may be tapered with a negative angle for self-locking and maintaining stability, as is typical for clutch systems.

The dog 204 is engageable with a backward drive gear wheel as shown in part in simplified form by numeral 210. The backward drive gear wheel 210 has gear teeth (not shown) that mesh with an input shaft (not shown). The backward drive gear wheel 210 has recesses such as recess 212. The recess 212 has tapered walls such as tapered wall 214 shaped to mate and engage with the claws such as claw 206 of the dog 204.

The dog clutch assembly 202 has a forward drive gear wheel as shown in part in simplified form by numeral 220. The forward drive gear wheel 220 has gear teeth (not shown) that mesh with the input shaft (not shown). The forward drive gear wheel 220 has recesses such as recess 222. Recess 222 has tapered walls such as tapered wall 224 shaped to mate and engage with the claws of the dog 204 such as corresponding claw 216. The tapered nature and negative angles of the walls 214 and 224 have been exaggerated for illustrative purposes.

The operation of the linear actuator 10 will now be described.

Figure 8:
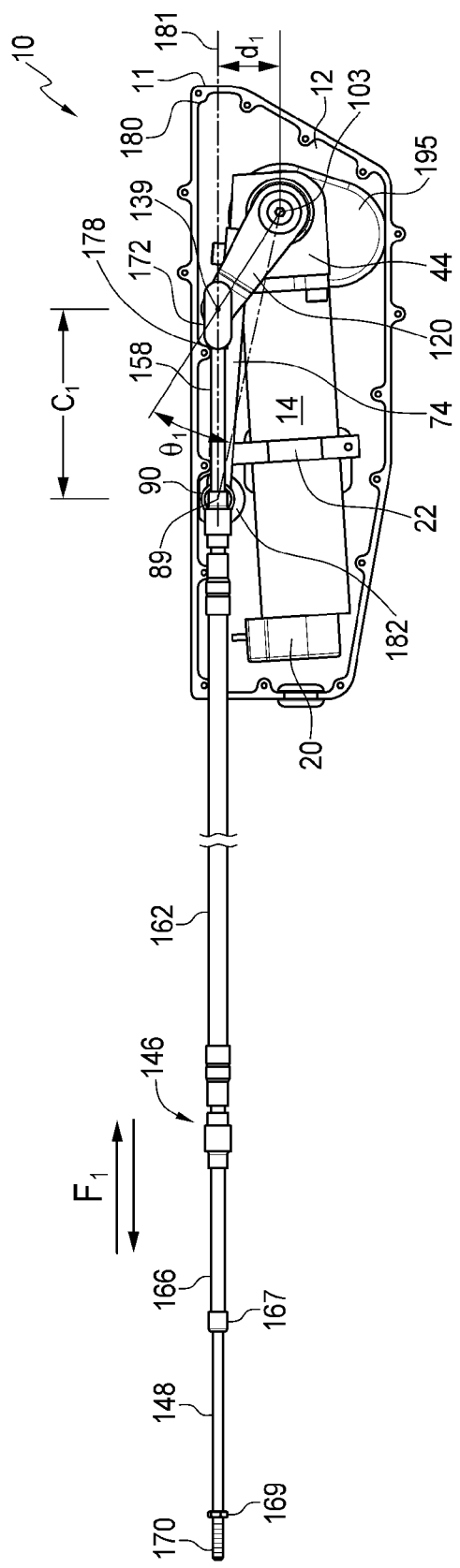
FIG. 8 is a side elevation view similar to FIG. 5 of the linear actuator and rod in a full extension mode.

Referring first to FIG. 8, the linear actuator 10 and rod 148 are shown at or near the end of a rearward stroke. The term rearward is used in this example to refer to the position of rod 148 when it is fully disposed to the left from the perspective of FIG. 8. The slider 172 is disposed to abut the first end 178 of the grooved slot 176 which is shown in FIG. 6. To arrive at the end of the rearward stroke, the motor 14 operatively pushes the rod 148 rearward, to the left from the perspective of FIG. 8. The motor does this by driving the bevel gears 50 and 100, the output shaft 104 thereby, and the arms 118 and 120 thereby as shown in FIG. 1. The rod 148 is received within the first sleeve 158 and extends outwards from the second sleeve 166. The rod 148 is then in a full extension mode as shown in FIG. 8.

A lateral distance $d_x$ may be defined as the perpendicular distance between the linear axis 181 along which the slider 172 moves and the axis of rotation 103 of the output shaft. The subscript "x" varies from 1 to 3 in FIGS. 8 to 10, respectively, to denote different lateral distances $d_1$, $d_2$ and $d_3$. In the mode of the linear actuator 10 shown in FIG. 8, lateral distance $d_1$ is relatively small. Thus, for a given output torque from the motor 14, the rod output force $F_x$ in this example $F_1$ is relatively high and the speed of the rod 148 is relatively low when the linear actuator 10 is at or near the end of the rearward stroke. For the rod output force $F_x$ the subscript "x" varies from 1 to 3 in FIGS. 8 to 10, respectively, to denote different rod output forces $F_1$, $F_2$, and $F_3$.

Referring now to FIG. 7, with the rod 148 operatively connected to the dog 204, when the rod 148 moves rearward, to the left from the perspective of FIG. 7, the dog 204 engages the backward drive gear wheel 210 at the end of the rearward stroke. The claws of the dog 204 such as claw 206 engage with the recesses of the backward drive gear wheel 210 such as recess 212.

Because at or near the end of the rearward stroke the lateral distance $d_1$ shown in FIG. 8 is relatively small, the linear actuator 10 is advantageously configured to provide the relatively high rod output force $F_1$ for disengaging the dog 204 from backward drive gear wheel 210. The arrangement of the linear actuator 10 is thus very beneficial for shifting applications where the shift load is highest which occurs when shifting out of gear. Typically clutch systems are self-locking and thus a relatively high disengagement force is required and desired to pull the dog 204 out of gear. In this example a relatively high force is required to separate the claws 206 of the dog 204 from the recesses 212 of the backward drive gear wheel 210, and this is provided for by the linear actuator 10 and rod 148 at or near the end of the rearward stroke of the linear actuator 10.

Figure 9:
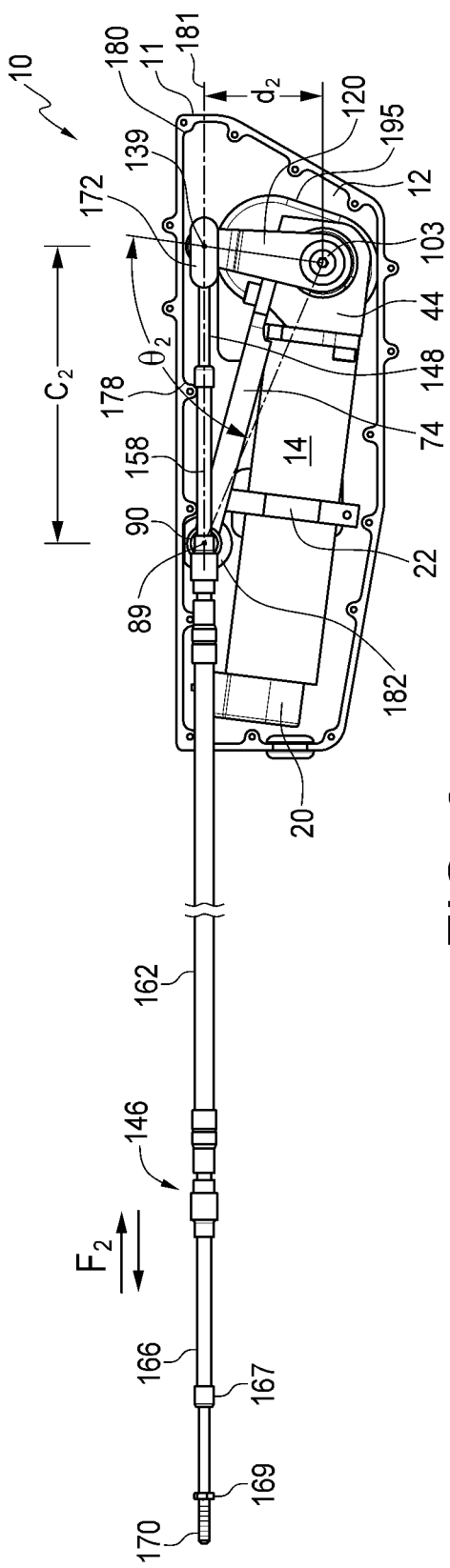
FIG. 9 is a side elevation view similar to FIG. 5 of the linear actuator and rod in a mid extension mode.

Referring now to FIG. 9, the linear actuator 10 and rod 148 are shown at or near mid stroke. The slider 172 is shown between the first end 178 and the second end 180 of the grooved slot. The motor 14 operatively pulls the rod 148 forward, to the right from the perspective of FIG. 9, in order to move the slider to this position from the position shown in FIG. 8. The rod 148 at least partially retracts within the second sleeve 166 and at least partially extends from the first sleeve 158. The rod 148 is in a mid extension mode.

As the slider 172 moves to the right, from the perspective of FIG. 9, the motor 14 is pushed by the arms such as arm 120 and is thereby caused to pivot downwards from the perspective of FIG. 9. The axis of rotation 103 is therefore caused to be further spaced-apart from the linear axis 181. Lateral distance $d_2$ is thus relatively large at or near mid stroke, compared to the lateral distance $d_1$ at or near the end of the rearward stroke shown in FIG. 8. Thus, for the same given output torque from the motor 14, the rod output force $F_2$ is relatively small and the speed of the rod is relatively high, as both compared to the corresponding values at the end of the rearward stroke.

Referring now both to FIGS. 7 and 9, with the rod 148 operatively connected to the dog 204, when the linear actuator 10 is at or near mid stroke, the dog 204 is in a neutral position. The dog 204 is free from the drive gear wheels 210 and 220. Because at or near mid stroke the lateral distance $d_2$ is relatively large, the linear actuator 10 is thus advantageously configured to provide a relatively high rod speed near or at the neutral position. This is advantageous because the faster a clutch moves from one drive gear wheel to an other, the more responsive is the system as a whole. As mentioned above, the linear actuator 10 also provides a low rod output force $F_2$ near or at the neutral position.

Figure 10:
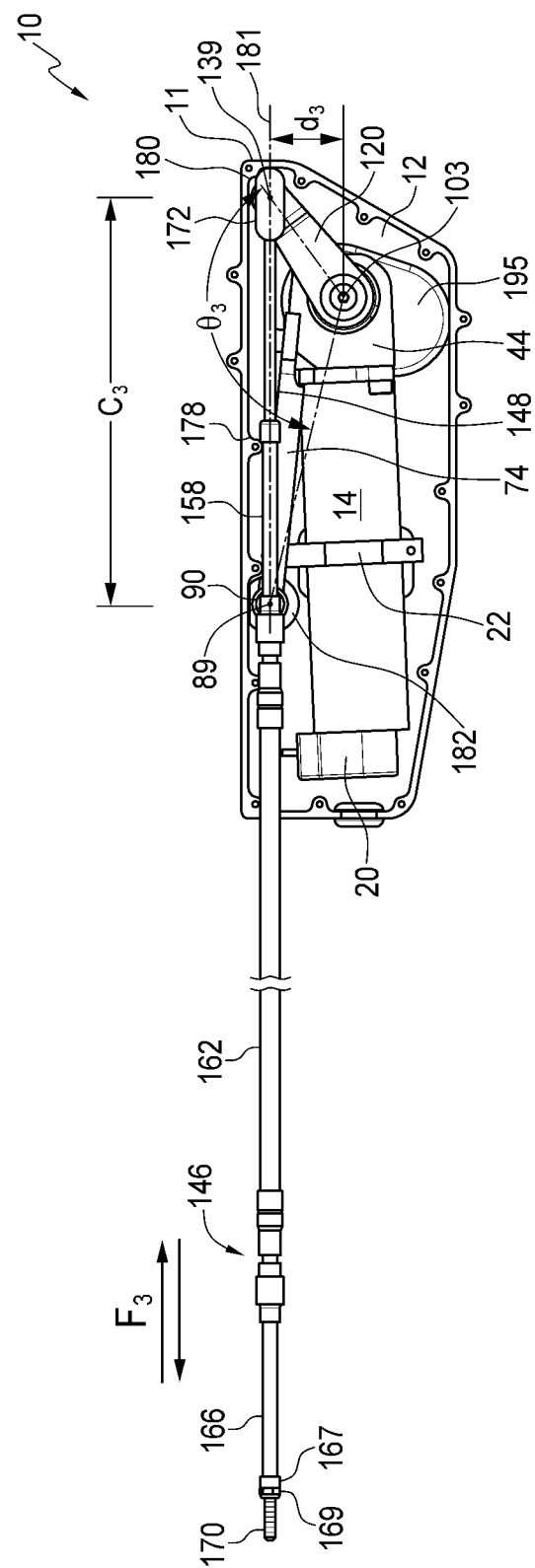
FIG. 10 is a side elevation view similar to FIG. 5 of the linear actuator and rod in a full retraction mode.

Referring now to FIG. 10, the linear actuator 10 and rod 148 are shown at or near the end of a forward stroke. The term forward is used in this example to refer to the position of rod 148 when it is fully disposed to the right from the perspective of FIG. 10. The slider 172 is shown abutting the second end 180 of the track. To move the slider to the end of the forward stroke, the motor 14 operatively pulls the rod 148 forward, to the right from the perspective of FIG. 10. The rod 148 is received within the second sleeve 166 and extends outwards from the first sleeve 158. The rod 148 is then in a full retraction mode.

As the slider 172 moves to the left, from the perspective of the figure, the motor 14 is pulled by the arms such as arm 120 and is thereby caused to pivot upwards from the perspective of FIG. 10. The axis of rotation 103 of shaft 104 is therefore is brought relatively closer to the linear axis 181. The lateral distance $d_3$ between these axes is thus relatively small at or near the end of the forward stroke, compared to the lateral distance $d_2$ at or near mid stroke shown in FIG. 9. Thus, for a given output torque from the motor 14, the rod output force $F_3$ is relatively high and the speed of the rod is relatively low.

Referring now to FIGS. 7 and 10, the rod 148 is operatively connected to the dog 204. When the rod 148 moves forward, to the right from the perspective of FIG. 10, the dog 204 will engage the forward drive gear wheel 220 at the end of the forward stroke. The claws of the dog 204 as shown by claw 216 engage the recesses of the forward drive gear wheel 220 as shown by recess 222.

Because at or the near end of the rearward stroke the lateral distance $d_3$ between axis 103 and 181 is relatively small, the linear actuator 10 is advantageously configured to provide the relatively high rod output force $F_3$ for disengaging the dog 204 from forward drive gear wheel 220. As with the situation involving the backward drive gear wheel 210, a relatively high force is required to separate the claws of the dog 204 from the recesses of the forward drive gear wheel 220. This is provided for by the linear actuator 10 and rod 148 at or near the end of the forward stroke of the linear actuator 10.

The linear actuator 10 and rod 148 may cycle between the various modes shown in FIGS. 8 to 10. The linear actuator thus provides a linear output movement, with the rod 148 being moveable in this example along the linear axis 181.

Figure 11:
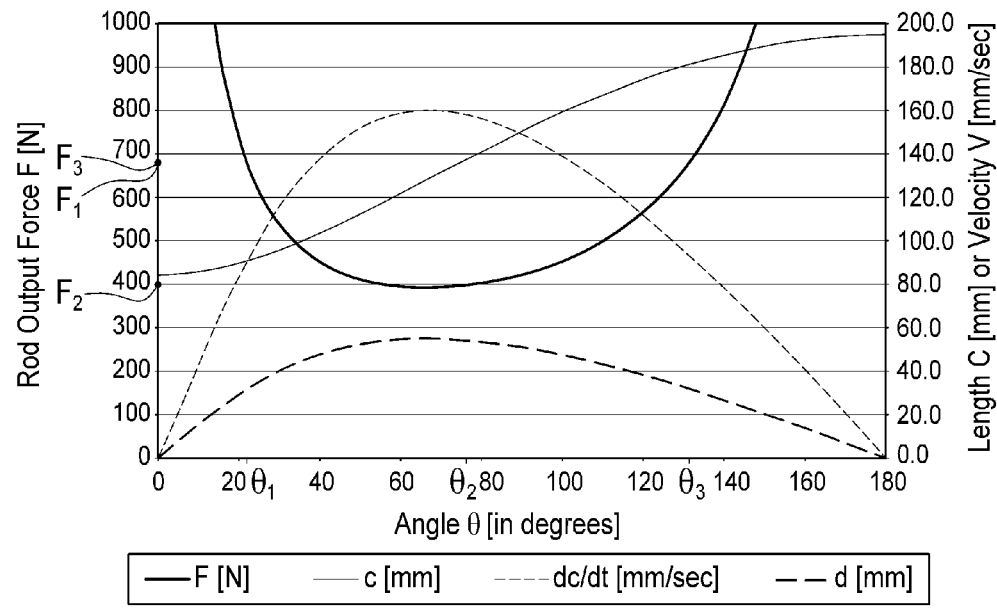
FIG. 11 is a graph illustrating one example of variable transmission ratio performance, and related data, for the linear actuator as the linear actuator passes through the modes illustrated in FIGS. 8 to 10.

Further details of the variable transmission ratio performance as described above are illustrated by way of example in the graph shown in FIG. 11. The rod output force F [N], shown on the left side of the graph, is charted along the y-axis. The angle θ [in degrees] between the arms 118, 120 and the line extending between the axis of rotation 103 and the first pivot axis 89, is charted along the x-axis of the graph. Length C [mm] defined as the distance between the first pivot axis 89 and the second pivot axis 139, is charted along the y-axis and is shown the right side of the graph. Linear velocity V [mm/sec] of the rod 148 is also charted along the y-axis and is shown on the right side of the graph.

Figure 12:
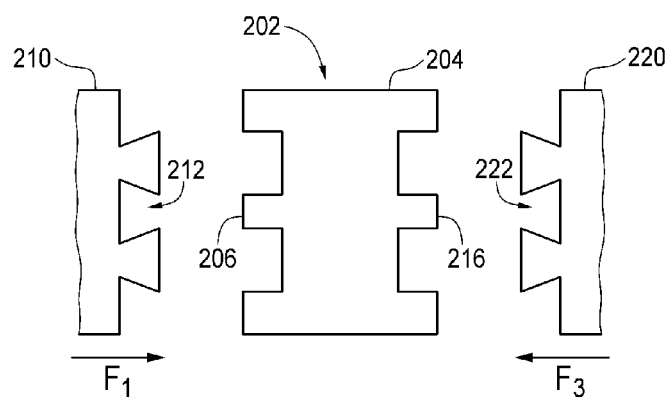
FIG. 12 is the clutch assembly of FIG. 7 shown in enlarged form and corresponding to the variable transmission ratio performance and related data illustrated in the graph of FIG. 11.

The graph data roughly corresponds to and aligns with the dog clutch assembly 202 of FIG. 12.

In the example shown on the graph of FIG. 11, the linear actuator 10 is designed to have a rod output force F capability of at least 600 N at or near the stroke ends and a speed of at least 150 mm/sec at or near mid stroke. A ratio of "rod output force F near or at the stroke end" to "rod output force at or near mid stroke" of approximately 1.5 was selected in order to use the variable transmission to its advantage.

Referring to FIG. 11 and as shown in the graph, the rod output force F is advantageously relatively high at smaller angles θ such as angle $θ_1$, which in this example is 22 degrees. Angle $θ_1$ corresponds to the linear actuator 10 being at or near the end of the rearward stroke, as shown in FIG. 8. Referring back to FIG. 11, the linear actuator 10 at angle $θ_1$ transmits in this example a corresponding rod output force $F_1$ of 683 N.

The rod output force F is also advantageously relatively high at larger angles such as angle $θ_3$, which in this example is 132 degrees. Angle $θ_3$ corresponds to the linear actuator 10 being at or near the end of the forward stroke, as shown in FIG. 10. Referring back to FIG. 11, the linear actuator 10 at angle $θ_3$ transmits in this example a corresponding rod output force $F_3$ of 685 N.

The rod output force F is relatively low at a range of angles generally midway between the end of the rearward and forward strokes, such as at angle $θ_2$, which in this example is 75 degrees. Angle $θ_2$ corresponds to the linear actuator 10 being at or near mid stroke, as shown in FIG. 9. Referring back to FIG. 11, the linear actuator 10 at angle $θ_2$ provides in this example a corresponding rod output force $F_2$ of 397 N.

The linear velocity v of the rod 148 is relatively low at smaller angles θ such as angle $θ_1$ where the linear actuator 10 is at or near the end of the rearward stroke. The linear velocity v of the rod 148 is also relatively low at larger angles such as angle $θ_3$ where the linear actuator 10 is at or near the end of the forward stroke. The linear velocity v of the rod 148 is advantageously relatively high at a range of angles between the end of the rearward and forward strokes, such as at angle $θ_2$ where the linear actuator 10 is at or near mid stroke.

The graph of FIG. 11 also shows the length c (defined as the distance between the first pivot axis 89 and the second pivot axis 139) as a function of the angle θ.

Lastly the graph shows the lateral distance d (defined as the perpendicular distance between the linear axis 181 upon which the slider 172 moves and the axis of rotation 103 of shaft 104) as a function of the angle θ. The lateral distance d changes throughout the stroke of the actuator. The lateral distance d represents in effect a variable moment arm. When the moment arm changes, the linear force and speed of the rod change for a fixed output torque from the motor. The variable moment arm in effect creates a new means for optimizing the speed and force of an actuator at different locations of the stroke.

Referring back to FIG. 1, the above variables displayed in the graph may be obtained at least in part from the first position sensor 20, and/or the second position sensor 66 used in conjunction with the magnet 109. The position sensors may also aid in monitoring the operation and functioning of the linear actuator 10. Position sensors are known to those skilled in the art and therefore will not be further discussed.

The variable transmission ratio characteristics as discussed and for example shown in the graph of FIG. 11 are especially beneficial for marine shifting applications. In a typical marine engine gear box, the two ends of the stroke are forward gear and reverse gear. The center of the stroke is a neutral position. For most of the common clutch types used in the field, such as a dog clutch, a cone clutch etc, the step of pulling out of gear requires the most force, especially when the engine is providing some speed and torque to drive the propeller. In the neutral area when the clutch is disengaged, the least force is required as there is little if any clutch friction and less clutch component inertia. In general, a system with a fast shift time is considered a good system as the user finds the system responsive. Providing a fast neutral speed helps to reduce the shift time.

The linear actuator 10 as herein disclosed with its variable transmission ratio provides a significant mechanical advantage at its two stroke ends for effectively disengaging a clutch. At the middle of the stroke, where high force is not required, the linear actuator 10 moves faster with a smaller mechanical advantage to reduce cycle time.

A traditional linear screw actuator typically only has one gear reduction ratio. For traditional linear screw actuators therefore one typically has to oversize the motor, and hence increase current draw and power input, in order to meet both the high force and high speed requirements. If the same relatively small motor is used, the motor may not achieve a high torque output given a small gear reduction ratio or may not achieve a high speed output given a large gear reduction ratio.

Because of the relatively large mechanical advantage provided by the linear actuator 10 at or near its end strokes, the present invention allows for a smaller motor and less input power to be used. The combination of higher efficiency and simpler design may result in the linear actuator 10 being more economical to manufacture as compared to lead-screw type or ball-screw type actuators. This is especially true in applications where the amount of power consumption is important, such as a requirement that there be relatively low power consumption from the linear actuator.

The efficiency of the linear actuator 10 will now be discussed in further detail.

Referring to FIG. 8, by operatively pushing the rod 148, the motor 14 causes the rod 148 to have a rod output force $F_1$. The rod output force $F_1$, which may be referred to as the line of action of the output force of the linear actuator 10, acts along the linear axis 181 in this embodiment. The line of action of the rod 148 intersects or substantially intersects the first pivot axis 89 in this embodiment. This creates a meta-stable condition. When the rod 148 actually intersects the first pivot axis 89, the lateral load (up and down force from the perspective of the figure) applied to the rod 148 is or tends towards zero. This is explained in further detail below.

Because the motor 14 (via the motor mount 74) can freely pivot at the first pivot axis 89, the torque created by the motor 14 at the axis of rotation 103 is internal to the actuator system and does not translate into a moment M at the first pivot axis 89. Since there are no other external moments applied to the linear actuator 10, the summation of the moment M at the first pivot axis 89 will equal to zero. Thus:

$$\Sigma M = F \times d_{offset} + F_{lateral} \times C = 0$$

where:

M is the moment at the first pivot axis 89;

$d_{offset}$ is the offset distance, in this case the vertical distance from the perspective of the figures, between the linear line of action (or linear axis 181) and the first pivot axis 89;

C is the horizontal distance, from the perspective of the figures, between the first pivot axis 89 and the second pivot axis 139;

F is the output force of the rod 148; and $F_{lateral}$ is the side load applied to the rod 148.

If the above equation is rearranged to isolate the side load $F_{lateral}$:

$$F_{lateral} = -\frac{d_{offset} \times F}{C}$$

Thus, the side load $F_{lateral}$ is directly proportional to the offset distance $d_{offset}$. When the offset distance $d_{offset}$ equals to zero, the side load $F_{lateral}$ also becomes zero.

The linear actuator 10 in the embodiment shown in FIGS. 1 and 10, with its $d_{offset}$ of zero, therefore provides the advantage of minimizing the side load $F_{lateral}$. In other words, all or close to all of the output force of the linear actuator 10 is transmitted into the rod output force F.

The linear actuator 10 in the illustrated embodiment thus is extremely efficient at transmitting force to the rod 148. This results in most of the torque provided by the arms 118 and 120 being transmitted into force divided by the lateral distance d between the axis of rotation 103 and the line of action (of linear axis 181).

When there is an offset distance $d_{offset}$ between the line of action (or linear axis 181) and the first pivot axis 89, a side load on the rod 148 exists. When the rod 148 is offset to the left of the first pivot axis 89, the side load will point to the left. When the rod is offset to the right of the first pivot axis 89, the side load will point to the right.

As may be appreciated from the above mentioned equation for side load $F_{lateral}$, the bigger the offset distance $d_{offset}$, the bigger the side load $F_{lateral}$.

However improved efficiency is still obtained even with some offset distance $d_{offset}$. Referring to FIG. 7, where the pivotal actuator member (in this case arms 118, 120) has an angle range of $+/-\theta$, the lateral movement is $R \times (1 - \cos(\theta))$, where R is the radius of the pivotal actuator member. It is foreseeable that one may have other constraints such that the line of action along linear axis 181 may not exactly coincide with the first pivot axis 89. Therefore, when the offset distance $d_{offset}$ between the first pivot axis 89 and the line of action of linear motion is within $R \times (1 - \cos(\theta))$, the linear actuator will partially benefit from the listed advantages such as relatively smaller side load. The closer the line of action is to the first pivot axis 89, the smaller is the side loading. Thus in variations of the present invention, some offset between the line of action (or linear axis 181) and the first pivot axis 89 will still provide significant efficiency improvements over traditional linear actuators.

The linear actuator 10 in the embodiment shown in the present invention is designed for marine shifting application. However those skilled in the art will appreciate that the linear actuator 10 may be used in non-marine applications.

Those skilled in the art will appreciate that many variations are possible within the scope of the invention. For example the motor 14 may be disposed with its motor shaft 30 parallel with the output shaft 104 and parallel with the axis of rotation 103. This may thereby remove the need for bevel gears. Similarly the motor shaft 30 and the output shaft 104 may be combined to comprise one part.

A worm gear box may be used instead of the bevel gear box 44. Other types of gears may be used instead of the bevel gears 50 and 100, such as for example planetary gears.

The motor 14 may be a gear motor. The motor may be hydraulically operated, instead of being electric powered.

The motor mount 74 is not required. The motor 14 may be directly pivotally connected to the housing 11.

The pivotal actuator member shown in the drawings is in the form of the two arms 118 and 120. However the pivotal actuator member may take other forms. For example, only one arm need be used. Alternatively the pivotal actuator member may for example be in the form of a rotatable disc.

Bearings may be used instead of bushings 90 and 92. Bearings may be used to connect the pivotal actuator member (in this case, arms 118 and 120) to the pivot pin member 138.

The pivot pin member 138 and the pivotal actuator member may be part of a single component and, in other words, need not be separate parts.

Alternatively, the pivotal actuator member may be adapted so as to remove the need for a separate slider (output member) 172. For example, the output end of the pivotal actual member may be directly linearly constrained with respect to the mounting member along the linear axis. This may be possible, for example, by providing the output end of the pivotal actuator member with a round, ball-like, or cylindrical-like shape that may be allowed to slide along a rail or slot.

A direct drive linkage may be used in conjunction with the linear actuator 10 instead of the rod 148 and rod apparatus 146.

In all situations where bolts were described threadably engaging apertures, those skilled in the art will appreciate of course that other forms of connection are possible. For example, bolts and nuts may be used with the apertures being slightly large for the bolts to simply pass therethrough.

It will be understood by someone skilled in the art that many of the details provided above are by way of example only and are not intended to limit the scope of the invention which is to be determined with reference to the following claims.

What is claimed:

1. A linear actuator, comprising:
a mounting member;
an output member constrained to move linearly with respect to the mounting member along a linear axis; and
a motor assembly pivotally connected to the mounting member, the motor assembly having a pivotal actuator member which is pivotally connected to the output member, the pivotal actuator member being capable of moving the output member along the linear axis.

2. The linear actuator as claimed in claim 1 wherein the mounting member has a fixed location fixed relative to the mounting member, the motor assembly is pivotally connected to the mounting member along a first pivot axis which coincides with the fixed location, the fixed location being slightly offset from the linear axis.

3. The linear actuator as claimed in claim 1 wherein the motor assembly is pivotally connected to the mounting member at a first pivot axis, the linear axis intersecting with the first pivot axis.

4. The linear actuator as claimed in claim 1 wherein the output member is constrained to move slidably with respect to the mounting member along the linear axis.

5. A linear actuator, comprising:
a mounting member; and
a motor assembly pivotally connected to the mounting member at a first pivot axis, the motor assembly having a pivotal actuator member which is pivotally connected to the mounting member at a second pivot axis at one end of the pivotal actuator member, the pivotal actuator member constrained to move linearly with respect to the mounting member along a liner axis at said one end, the motor assembly being capable of moving said one end of the pivotal actuator member along the linear axis.

6. A linear actuator comprising:
a mounting member having an elongate portion;
a motor having a motor housing;
an output shaft operatively connected to and driven by the motor;
a motor mount having a first end and a second end spaced-apart from the first end, the first end being operatively connected to the motor housing, the motor mount pivotally connecting to the mounting member near the second end of the motor mount; and
an arm having an input end operatively connected to the output shaft and an output end positioned radially outwards from the output shaft, the output end of the arm being slidable along the elongate portion of the mounting member, the arm being connectable to a rod for moving the rod in a path parallel with the elongate portion thereby.

7. The linear actuator as claimed in claim 6, wherein the elongate portion of the mounting member and the output end of the arm are disposed along a common plane.

8. The linear actuator as claimed in claim 6 further including a slider operatively connected to the arm at the output end of the arm, the slider slidably connecting to and engaging with the elongate portion of the mounting member, the slider being operatively connectable with the rod.

9. The linear actuator as claimed in claim 8, wherein the elongate portion includes a grooved slot, the slider being slidably disposed therein.

10. The linear actuator as claimed in claim 6 wherein the elongate portion of the mounting member is at least partially parallel with the motor mount.

11. The linear actuator as claimed in claim 6 wherein the output shaft has an axis of rotation, the motor mount is pivotally connected near its second end to the mounting member along a first pivot axis and the elongate portion is spaced-apart from the first pivot axis at an offset distance equal to or less than $R \times (1 - \cos \theta)$, where R is the distance between the input end of the arm and the output end of the arm, and $\theta$ is the angle between the arm and the line extending between the axis of rotation of the output shaft and the first pivot axis.

12. The linear actuator as claimed in claim 11, wherein $\theta$ is more specifically the angle between the line drawn through the input end and the output end of the arm and the line extending between the axis of rotation of the output shaft and the first pivot axis.

13. In combination, the linear actuator as claimed in claim 6 and the rod for connection therewith, the rod operatively connecting to the arm.

14. A linear actuator, comprising:
a mounting member;
a motor pivotally mounted to the mounting member;
an output shaft operatively connected to and driven by the motor; and
a pivotal actuator member having an input end connected to the output shaft and an output end positioned radially outwards from the output shaft, the pivotal actuator member constrained to move linearly with respect to the mounting member at its output end along a linear axis, the motor being capable of moving the output end of the pivotal actuator member along the linear axis thereby.

15. The linear actuator as claimed in claim 14 further including an output member constrained to move linearly with respect to the mounting member along the linear axis, and a pivot pin member, the pivotal actuator member pivotally connecting to the pivot pin member, the pivot pin member engaging with the output member.

16. The linear actuator as claimed in claim 14 wherein the output shaft has an axis of rotation, the motor is pivotally connected to the mounting member along a first pivot axis and the linear axis along which the output end of the pivotal actuator member moves is spaced-apart from the first pivot axis at an offset distance equal to or less than R ×(1−cos θ), where R is the radial distance of the pivotal actuator member extending between the output shaft and the output end and θ is the angle between the pivotal actuator member and the line extending between the axis of rotation of the output shaft and the first pivot axis.

17. The linear actuator as claimed in claim 16, wherein θ is more specifically the angle between the line extending between the output shaft and the output end of the pivotal actuator member and the line extending between the axis of rotation of the output shaft and the first pivot axis.

\* \* \* \* \*

UNITED STATES PATENT AND TRADEMARK OFFICE
CERTIFICATE OF CORRECTION

| | | |
|---|---|---|
| PATENT NO. | : 8,516,916 B2 | |
| APPLICATION NO. | : 12/815706 | |
| DATED | : August 27, 2013 | |
| INVENTOR(S) | : Jon Scott et al. | |

It is certified that error appears in the above-identified patent and that said Letters Patent is hereby corrected as shown below:

In the Claims, Claim 5 should read:

5. A linear actuator, comprising:

a mounting member; and a motor assembly pivotally connected to the mounting member at a first pivot axis, the motor assembly having a pivotal actuator member which is pivotally connected to the mounting member at a second pivot axis at one end of the pivotal actuator member, the pivotal actuator member constrained to move linearly with respect to the mounting member along a linear axis at said one end, the motor assembly being capable of moving said one end of the pivotal actuator member along the linear axis.

Signed and Sealed this
Twelfth Day of November, 2013

Teresa Stanek Rea
*Deputy Director of the United States Patent and Trademark Office*